United States Patent
Pita-Gil

(10) Patent No.: US 9,156,444 B2
(45) Date of Patent: Oct. 13, 2015

(54) METHOD FOR CONTROLLING AT LEAST ONE MEANS FOR RECUPERATING THE ENERGY GENERATED UNDER BRAKING OF A MOTOR VEHICLE

(75) Inventor: Guillermo Pita-Gil, Montigny-le-Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/234,900

(22) PCT Filed: Jul. 19, 2012

(86) PCT No.: PCT/FR2012/051708
§ 371 (c)(1),
(2), (4) Date: Apr. 8, 2014

(87) PCT Pub. No.: WO2013/014371
PCT Pub. Date: Jan. 31, 2013

(65) Prior Publication Data
US 2014/0214298 A1    Jul. 31, 2014

(30) Foreign Application Priority Data

Jul. 25, 2011    (FR) .................................. 11 02316

(51) Int. Cl.
*G06G 7/00* (2006.01)
*F16D 65/28* (2006.01)
(Continued)

(52) U.S. Cl.
CPC ... *B60T 1/10* (2013.01); *B60L 7/18* (2013.01); *B60L 7/26* (2013.01); *B60L 15/2018* (2013.01);
(Continued)

(58) Field of Classification Search
CPC ......... B60L 7/18; B60L 7/26; B60L 15/2018; B60L 2240/12; B60L 2240/423; B60L 2260/50; B60L 2270/145; B60T 1/10; Y02T 10/642; Y02T 10/7275
USPC ................... 701/22, 70; 188/156; 303/3, 152; 903/903, 930
See application file for complete search history.

(56) References Cited

U.S. PATENT DOCUMENTS 4,123,693 A    10/1978    Anderson et al.
5,253,929 A *  10/1993    Ohori ............................... 303/3
(Continued)

FOREIGN PATENT DOCUMENTS

EP            0 917 978        5/1999

OTHER PUBLICATIONS

International Search Report Issued Nov. 15, 2012 in PCT/FR12/051708 Filed Jul. 19, 2010.
(Continued)

*Primary Examiner* — Calvin Cheung
*Assistant Examiner* — Angelina Shudy
(74) *Attorney, Agent, or Firm* — Oblon, McClelland, Maier & Neustadt, L.L.P.

(57) ABSTRACT

A method for controlling a motor vehicle equipped with wheels, brakes, a recovery device for recovering energy generated in braking, and a torque transmission chain from the wheels to the recovery device, includes acquiring a braking instruction, measuring a measured value of a dynamic characteristic of the recovery device, calculating a first intermediate setpoint with a preventive filter which filters the braking instruction so as to attenuate an amplitude of the braking instruction around a resonance frequency of the torque transmission chain, calculating a second intermediate setpoint to damp oscillations of the torque transmission chain, controlling the recovery device according to an electric motor control setpoint calculated as a function of the first and second intermediate setpoints, and controlling the brakes according to a braking setpoint calculated as a function of the braking instruction.

9 Claims, 3 Drawing Sheets

(51) Int. Cl.
  *B60T 1/10*   (2006.01)
  *B60L 7/18*   (2006.01)
  *B60L 7/26*   (2006.01)
  *B60L 15/20*  (2006.01)

(52) U.S. Cl.
  CPC ........ *B60L 2240/12* (2013.01); *B60L 2240/423* (2013.01); *B60L 2260/50* (2013.01); *B60L 2270/145* (2013.01); *Y02T 10/642* (2013.01); *Y02T 10/7275* (2013.01)

(56) References Cited

U.S. PATENT DOCUMENTS

| | | | | |
|---|---|---|---|---|
| 5,713,814 | A * | 2/1998 | Hara et al. | 477/5 |
| 5,910,722 | A | 6/1999 | Lyons et al. | |
| 5,951,115 | A * | 9/1999 | Sakai et al. | 303/3 |
| 6,231,134 | B1 * | 5/2001 | Fukasawa et al. | 303/152 |
| 6,574,535 | B1 * | 6/2003 | Morris et al. | 701/22 |
| 7,322,331 | B2 * | 1/2008 | Tamagawa et al. | 123/179.3 |
| 2004/0195914 | A1 * | 10/2004 | Beck et al. | 303/191 |
| 2005/0060076 | A1 | 3/2005 | Phillips et al. | |
| 2006/0025905 | A1 * | 2/2006 | Zhao et al. | 701/22 |
| 2006/0025906 | A1 * | 2/2006 | Syed et al. | 701/22 |
| 2011/0148184 | A1 * | 6/2011 | Suzuki et al. | 303/3 |
| 2011/0246039 | A1 * | 10/2011 | Takeda et al. | 701/70 |
| 2012/0022730 | A1 * | 1/2012 | Maass et al. | 701/22 |
| 2012/0022735 | A1 * | 1/2012 | Tashiro et al. | 701/22 |
| 2012/0109441 | A1 * | 5/2012 | Vespasien | 701/22 |
| 2012/0130581 | A1 * | 5/2012 | Semsey et al. | 701/22 |
| 2012/0330485 | A1 * | 12/2012 | Tamagawa | 701/22 |
| 2013/0204502 | A1 * | 8/2013 | Biller et al. | 701/70 |
| 2014/0012476 | A1 * | 1/2014 | Azzi et al. | 701/70 |
| 2014/0297085 | A1 * | 10/2014 | Hayashi et al. | 701/22 |

OTHER PUBLICATIONS

French Search Report Issued Apr. 25, 2012 in French Application No. 11 02316 Filed Jul. 25, 2011.

* cited by examiner

METHOD FOR CONTROLLING AT LEAST ONE MEANS FOR RECUPERATING THE ENERGY GENERATED UNDER BRAKING OF A MOTOR VEHICLE

TECHNICAL FIELD TO WHICH THE INVENTION RELATES

The present invention relates generally to the braking of a motor vehicle.

It applies to the motor vehicles that include a means for recovering the energy generated in braking, and a torque transmission chain from the wheels to the recovery means.

It relates more particularly to a method for controlling such a motor vehicle, comprising steps:
- a) of acquiring a braking instruction,
- b) of measuring a measured value of a dynamic characteristic of the recovery means,
- c) of calculating a first intermediate setpoint by means of a preventive filter which filters said braking instruction so as to attenuate its amplitude around the resonance frequency of the torque transmission chain,
- d) of calculating a second intermediate setpoint, created to damp the oscillations of the torque transmission chain by means of a curative filter which filters the measured value of said dynamic characteristic,
- e) of controlling said recovery means according to a control setpoint calculated as a function of said first and second intermediate setpoints, and
- f) of controlling the brakes according to a braking setpoint calculated as a function of the braking instruction acquired in the step a).

The invention is particularly advantageously applicable in the motor vehicles with electric or hybrid propulsion, in which said recovery means is formed by the electric propulsion motor itself.

TECHNOLOGICAL BACKGROUND

In the motor vehicles of the abovementioned type, the recovery means is provided to complement the brakes. It thus makes it possible not only to slow down the vehicle, but also to store a portion of the energy generated by the braking of the vehicle, in order to be able to reuse it subsequently.

This recovery means thus makes it possible to reduce the energy consumption of the vehicle and the wear of the brake pads.

In braking on this type of vehicle, torque oscillation phenomena are generally observed which are transmitted to the wheels, which generates jerks affecting the comfort of the passengers of the vehicle and the wear of the elements involved in the vehicle traction and braking.

These oscillations originate from the torque transmission chain which, because each of its members exhibits a non-zero rigidity and damping, is deformed (by torsion, bending, traction, compression) with an amplitude and a frequency which vary as a function of the transmitted torque and of the ageing of the various components.

There is then known from the document FR 1100216, not yet disclosed on the date of filing of the present application, a control method of the abovementioned type, which makes it possible to control the recovery means in such a way that the oscillations of the torque transmission chain are correctly damped and the quantity of energy in each braking operation is significant.

While this solution proves to be partly satisfactory, incipient oscillations of the torque transmission chain are, however, observed at the start of each braking operation, during a short time period, which continues to affect the comfort of the passengers of the vehicle.

OBJECT OF THE INVENTION

In order to optimize the comfort of the passengers of the vehicle, the present invention proposes a control method that is optimized to prevent the incipient oscillations of the transmission chain.

More particular, there is proposed, according to the invention, a control method as defined in the introduction, in which, in the step d), a forecast value of said dynamic characteristic is estimated using a forecast mathematical model, and the second intermediate setpoint is calculated as a function also of this forecast value.

The applicant has observed that the incipient oscillations of the transmission chain were poorly damped because of the slow speed of response of the control unit at the time when these oscillations occur.

Three types of delays are in fact distinguished—measurement, calculation and control—which make it impossible to control the energy recovery means with sufficient responsiveness.

The measurement delays correspond to a lapse of time which passes between the moment when the oscillations appear and that when they are actually detected by the control unit.

The calculation delays correspond to the lapse of time which passes between the moment when the oscillations are detected by the control unit and that when the control unit emits a control signal for the energy recovery means which takes account of the oscillations that have appeared.

The control delays correspond to the lapse of time which passes between the moment when the control unit emits a control signal for the energy recovery means which takes account of the oscillations that have appeared and that when the signal is actually implemented by the energy recovery means.

These three delays generate an overall delay of approximately 100 milliseconds, which proves significant with respect to the oscillation frequency of the torque transmission chain (approximately 7 Hz).

By virtue of the invention, the energy recovery means is controlled as a function not only of the measured value (with delay) of the dynamic characteristic of the energy recovery means, but also as a function of the forecast value (determined in advance) of this dynamic characteristic.

The forecast value of the dynamic characteristic thus makes it possible to prevent any incipient oscillation even before these oscillations are detected by the control unit, in such a way that the control unit can instantaneously counter these oscillations.

For its part, the measured value of the dynamic characteristic makes it possible to limit the forecasting errors.

Other advantageous and nonlimiting features of the control method according to the invention are as follows:
- said control setpoint, said first intermediate setpoint and said second intermediate setpoint are torque setpoints;
- the recovery means consisting of an electric motor, said dynamic characteristic consists of the speed of the electric motor;
- in the step d), the second intermediate setpoint is calculated as a function of the difference between the measured value and the forecast value of said dynamic characteristic;

said difference is filtered to reduce its high-frequency noise, before being filtered by the curative filter;

in the step c), the second intermediate setpoint is calculated to be equal to the sum between, on the one hand, said filtered difference, and, on the other hand, an expected value of the dynamic characteristic;

the expected value of the dynamic characteristic is calculated as a function of the control setpoint and of the braking setpoint;

said forecast value is calculated as a function of said expected value of the dynamic characteristic, taking into account the delay between the measurement performed in the step b) and the control of said recovery means performed in the step e);

in the step e), the control setpoint is calculated as a function of the saturated value of the first intermediate setpoint; and in the step e), the control setpoint is calculated to be equal to the saturated value of the sum between, on the one hand, the second intermediate setpoint, and, on the other hand, the saturated value of the first intermediate setpoint.

The invention also proposes a motor vehicle as defined in the introduction, equipped with a control unit arranged to control the implementation of the abovementioned control method.

DETAILED DESCRIPTION OF AN EXEMPLARY EMBODIMENT

The description which follows with regard to the appended drawings, given as nonlimiting examples, will give a good understanding of the invention and how it can be produced.

Figure 1:
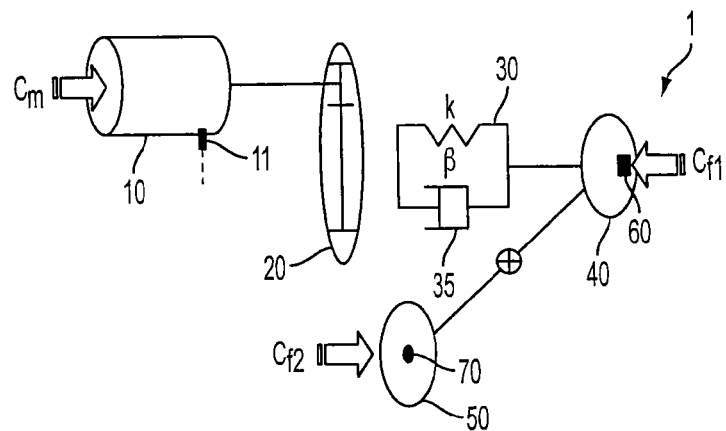
FIG. 1 is a very schematic view of a motor vehicle according to the invention, notably showing its brakes and its energy recovery means.
Figure 6:
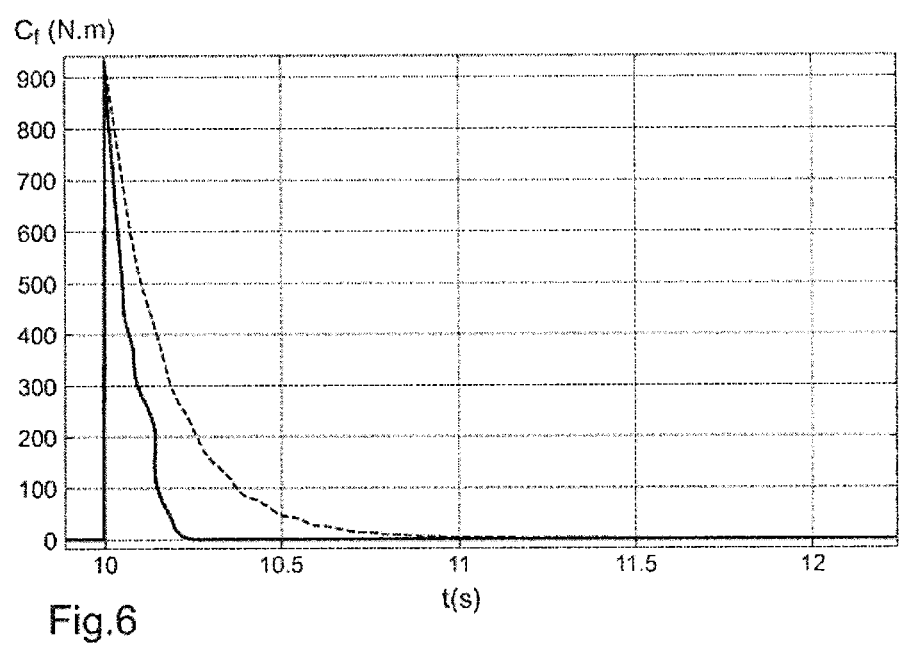

FIG. 6 is a graph illustrating, on a first curve shown by continuous line, the variations of the control setpoint for the brakes of the motor vehicle of FIG. 1 after the driver has ordered the braking of the vehicle, and, on a second curve shown in broken lines, the variations of the control setpoint for the brakes of a motor vehicle in which the control system would not include any forecast mathematical model.

In FIG. 1, a motor vehicle 1 is represented very schematically.

This motor vehicle conventionally comprises two drive wheels 40 (illustrated in FIG. 1 by a single circle) and two non-drive wheels 50 (illustrated in FIG. 1 by another circle).

Here, this motor vehicle 1 is an electric vehicle. It therefore comprises an accumulator battery (not represented), an electric motor 10 powered by this accumulator battery and a torque transmission chain 20 from the engine 10 to the drive wheels 40, which comprises in particular a gearing mechanism.

As is illustrated schematically in FIG. 1, this transmission chain 20 exhibits a non-zero elasticity that can be modeled by a spring 30 of rigidity denoted k and by a damping piston 35 denoted β.

This transmission chain 20 is thus likely to be deformed (by torsion, bending, traction, compression) and to oscillate with a frequency and an amplitude which vary as a function of the torque transmitted from the electric motor 10 to the drive wheels 40 or from the drive wheels 40 to the electric motor 10. After studying this transmission chain, it is observed that it exhibits a natural mode at which it is likely to oscillate strongly, at a frequency called main resonance frequency.

The motor vehicle 10 also comprises two types of braking means, dissipative braking means and a recuperative braking means (also called "energy recovery means").

The dissipative braking means are here disk brakes 60, 70 with which the drive 40 and non-drive 50 wheel trains are equipped. As a variant, they could also be drum brakes.

The recuperative braking means is here formed by the electric motor 10 itself, which then has an alternator function inasmuch as it is designed to brake the drive wheels 40 when the vehicle is advancing and to convert the kinetic energy of the vehicle into an electrical energy powering the accumulator battery.

To control its various members, the motor vehicle 1 includes a computer comprising a processor (CPU), a random-access memory (RAM), a read-only memory (ROM) and various input and output interfaces.

By virtue of its input interfaces, the computer is designed to receive input signals originating from various sensors 11, 81. It is in particular designed to acquire the speed of rotation $\Omega_m$ of the electric motor 10 by means of a speed sensor 11 and the position of the brake pedal 80 and/or the pressure exerted on the brake pedal 80 (FIG. 2) by means of a sensor 81.

Figure 2:
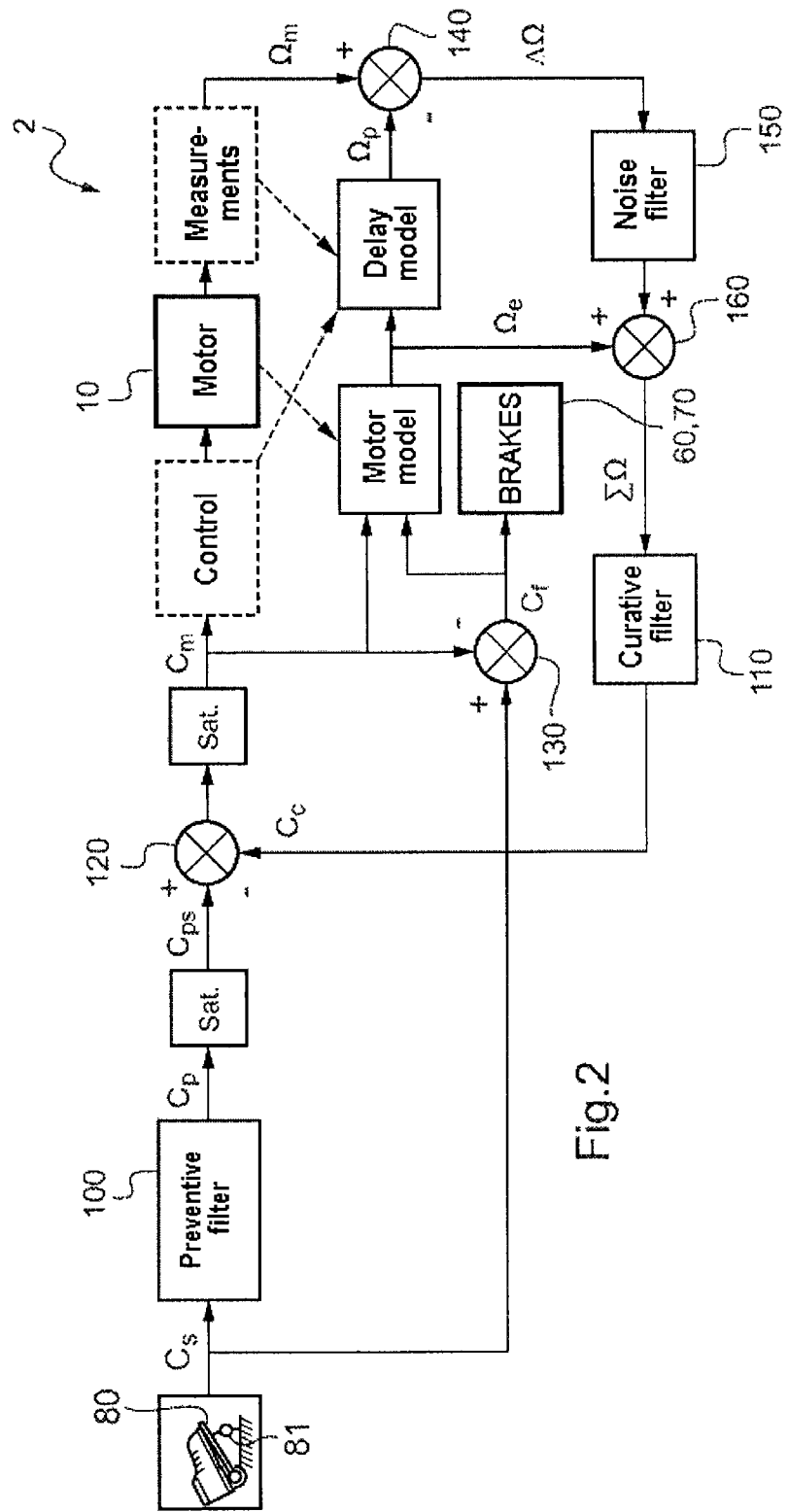
FIG. 2 is a diagram illustrating the brake control system and the energy recovery means of the motor vehicle of FIG. 1.

By virtue of software 2 installed in its read-only memory and schematically illustrated in FIG. 2, the computer is designed to calculate, for each operating condition of the motor vehicle 1, control setpoints for the electric motor 10 and for the brakes 60, 70.

Finally, by virtue of its output interfaces, the computer is designed to transmit these control setpoints to the electric motor 10 and to the brakes 60, 70.

The computer is designed, when the driver presses on the brake pedal 80, to implement a control method for the electric motor 10 and the brakes 60, 70 which breaks down into eleven main operations illustrated in FIG. 2.

The first operation is a data acquisition operation.

During this operation, through its input interfaces, the computer acquires the instantaneous position of the brake pedal 80 and/or the instantaneous pressure exerted on it by the driver, as well as the measured value $\Omega_m$ of the speed of the electric motor 10.

The second operation is an operation for determining the intensity with which the driver wants to brake the motor vehicle 1.

During this operation, the computer deduces from the position of the brake pedal 80, and/or from the pressure exerted on it, the value of the braking torque Cs desired by the driver.

This desired braking torque Cs therefore corresponds to the sum of the braking torques to be applied to the electric motor 10 and to the brakes 60, 70 of the drive wheels 40 and non-drive wheels 50 of the motor vehicle 1.

The third operation is a preventive filtering operation on this desired braking torque Cs.

During this operation, the computer calculates the value of a first intermediate torque Cp, using a preventive filter 100 which filters the desired braking torque Cs so as to attenuate its amplitude around the resonance frequency of the torque transmission chain 20.

This preventive filter 100 thus makes it possible to filter the control setpoint of the electric motor 10, to prevent the latter from excessively exciting the natural mode of the torque transmission chain 20, which would generate jerks affecting the comfort of the passengers of the vehicle.

The benefit of this preventive filter 100 is therefore in reducing the appearance of such oscillations.

Figure 3:
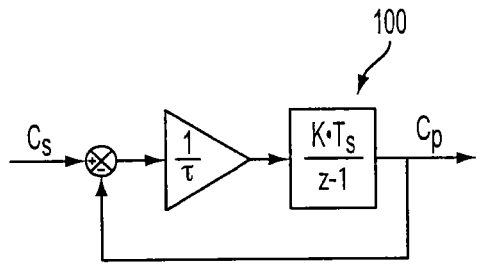
FIG. 3 is a diagram illustrating the preventive filter of the control system of FIG. 2.
Figure 4:
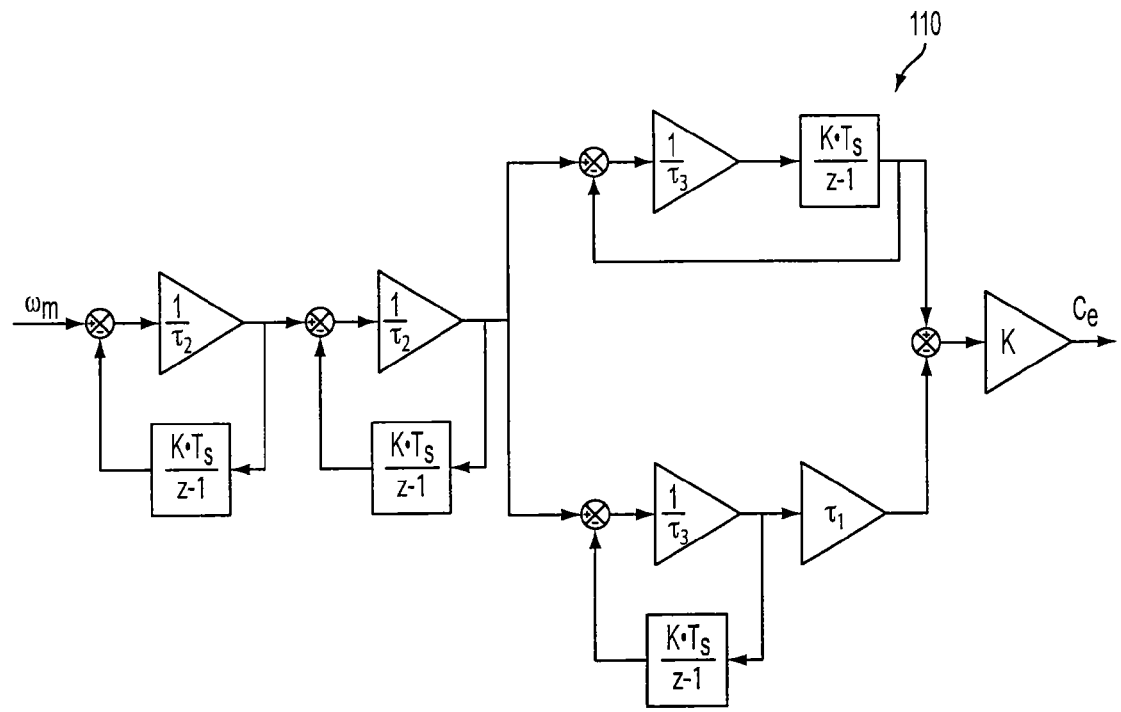
FIG. 4 is a diagram illustrating the curative filter of the control system of FIG. 2.

As represented in FIG. 3, this preventive filter 100 is a low-pass filter for which the cut-off pulsing (equal to $1/\tau$) is chosen as a function of the main resonance frequency of the torque transmission chain 20. In FIG. 3 and FIG. 4 (discussed further below), Ts is the sampling time and the block K·Ts/z−1 is a discrete time integrator with a gain equal to 1 and the sampling time Ts.

The fourth operation is an operation of saturation of the first intermediate torque Cp.

During this operation, the computer calculates the value of a saturated first intermediate torque Cps which, unlike the first intermediate torque Cp, always remains lower than the maximum braking torque Cmax that the electric motor 10 can assume on its own.

This operation consists, for the computer, in limiting the value of the first intermediate torque Cp by performing the following calculation:

$$Cps=\min(Cp,Cmax).$$

The fifth operation is an operation of generating a control setpoint Cm for the electric motor 10.

This operation consists in calculating, by means of a subtractor 120, a torque difference AC between the saturated first intermediate torque Cps and a second intermediate torque Ce (for which the detail of the calculation will be described below in this description), then in saturating this torque difference AC.

To put it another way, this operation consists, for the computer, in performing the following calculation:

$$Cm=\min(Cps-Ce,Cmax).$$

The control setpoint Cm that is thus obtained is then transmitted to the electric motor 10.

The second operation of saturation of the torque difference AC then makes it possible to control the electric motor 10 according to a control setpoint Cm that the motor can support.

The first operation of saturation of the first intermediate torque Cp is not redundant with this second saturation operation, since it makes it possible for the value of the second intermediate torque Ce to always have an influence on the value of the control setpoint Cm, in particular when the first intermediate torque Cp is very much greater than the maximum torque Cmax and the second intermediate torque Ce.

The sixth operation is an operation of generating a control setpoint Cf for the brakes 60, 70.

This operation is performed using a subtractor 130 which calculates the difference between the desired braking torque Cs and the control setpoint Cm of the electric motor 10.

The calculation of the control setpoint Cf thus makes it possible to control the brakes 60, 70 in such a way that they take over the portion of the desired braking torque Cs which cannot be assumed by the electric motor 10.

The control setpoint Cf is then distributed between the brakes 60, 70 of the two drive 40 and non-drive 50 wheel trains according to a predetermined distribution, of the form:

$$Cf=a\cdot Cf1+(1-a)\cdot Cf2, \text{ with}$$

a: a predetermined constant,

Cf1: the portion of the control setpoint Cf transmitted to the brakes 60 of the drive wheels 40, and Cf2: the portion of the control setpoint Cf transmitted to the brakes 70 of the non-drive wheels 50.

The following operations are implemented to calculate the value of the abovementioned second intermediate torque Ce.

This second intermediate torque Ce makes it possible, as a function of the speed of the electric motor 10, to take account "in real time" of the behavior of this electric motor 10 in order to best damp the oscillations of the torque transmission chain 20, by countering them.

According to a particularly advantageous feature of the invention, this second intermediate torque Ce is calculated as a function not only of the measured value $\Omega_m$ of the engine speed, but also as a function of a forecast value $\Omega_p$ of the engine speed previously determined using a forecast mathematical model.

There is, in effect, a latency time between the moment of the measurement of the engine speed and the moment when the engine is controlled as a function of this measurement. Consequently, because of these measurement and control delays, just the measured value $\Omega_m$ would not make it possible on its own to control the motor in such a way as to counter the first oscillations of the torque transmission chain 20, upon their appearance.

The forecast value $\Omega_p$ therefore makes it possible to prevent any incipient oscillation even before these oscillations are detected by the computer, so that the latter can instantaneously counter the incipient oscillations.

The calculation of the second intermediate torque Ce is more specifically performed as follows.

The seventh operation is an operation of calculating an expected value $\Omega_e$ of the engine speed.

This expected value $\Omega_e$ corresponds to the value that the engine speed should normally exhibit, given the deceleration of the motor vehicle.

During this operation, the computer determines the expected value $\Omega_e$ of the engine speed as a function of the control setpoints Cm, Cf of the brakes 60, 70 and of the electric motor 10, and as a function of the inertia of the motor vehicle.

It is observed that this calculation does not however take into account the control and measurement delays, so that the expected value $Q_e$ varies with a slight delay in relation to the real value of the engine speed.

The eighth operation is an operation of calculating said forecast value $Q_p$ of the engine speed.

During this operation, the computer corrects the expected value $Q_e$ of the engine speed as a function of the control and measurement delays (which are furthermore known and which depend on the architecture of the motor), by means of a forecast mathematic model.

During a ninth operation, the computer calculates, by means of a subtractor 140, the difference in speed $\Delta\Omega$ between the measured value $\Omega_m$ and the forecast value $\Omega_p$ of the engine speed, then filters this speed difference $\Delta\Omega$ by means of a high-frequency filter 150.

This high-frequency filter 150 is, here, a second order low-pass filter which makes it possible to reduce the noise due in particular to the inaccuracies of the measurement of the measured value $\Omega_m$ of the engine speed, in order to prevent this noise from then being amplified and substantially affecting the control of the electric motor 10.

During a tenth operation, the computer calculates, by means of a summer 160, the sum $\Sigma\Omega$ between, on the one hand, said filter difference $\Delta\Omega$, and, on the other hand, the expected value $\Omega_e$ of the engine speed.

The eleventh and ultimate operation is a curative filtering operation on this sum $\Sigma\Omega$.

During this operation, the computer determines the value of the second intermediate torque Ce by means of a curative filter 110 which filters the variations of this sum $\Sigma\Omega$, in such a way that the control setpoint Cm of the electric motor 10 makes it possible to best damp the oscillations of the torque transmission chain 20.

This curative filter 110 comprises a double derivative. As FIG. 4 shows, this curative filter 110 here takes the form $$\frac{Ks^2(1+\tau_1 s)}{(1+\tau_2 s)^2(1+\tau_3 s)},$$

with
- s: the Laplace operator, which symbolizes the time derivative dx/dt,
- K: a gain of the control loop,
- $\tau_2$: the filtering time constant of the second order derivative of the numerator, and
- $\tau_1$ and $\tau_3$: a pair of zero/pole that ensures appropriate stability margins to the closed loop.

In this way, when the pressure on the brake pedal 80 is maintained, the braking initially assured by the brakes 60, 70 is rapidly toggled to the electric motor 10, which then on its own assures the braking of the motor vehicle 1. It is thus possible to recover a maximum quantity of electrical energy, obviously subject to the capacity of the electric motor 10 to brake the vehicle.

Figure 5:
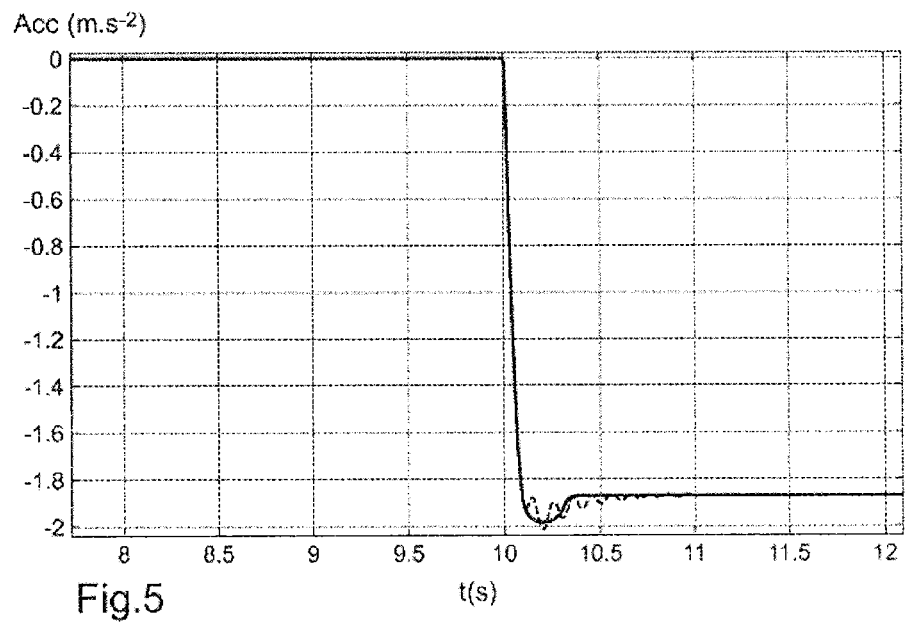
FIG. 5 is a graph illustrating, on a first curve shown by continuous line, the variations of the acceleration of the motor vehicle of FIG. 1 in time after the driver has ordered the braking of the vehicle, and, on a second curve shown in broken lines, the variations of the acceleration of a motor vehicle in which the control system would not include any forecast mathematical model.

FIGS. 5 and 6 illustrate the results obtained when the driver presses suddenly on the brake and keeps it pressed. The results obtained through the invention are represented in continuous lines. The results which would be obtained without using the forecast mathematical model (that is to say by directly filtering the measured value $\Omega_m$ by the curative filter to obtain the second intermediate torque Ce) are represented in dotted lines.

FIG. 5 shows the variations of the longitudinal acceleration of the motor vehicle.

It will be observed in this figure that the oscillations of the longitudinal acceleration of the vehicle exhibit not only a reduced amplitude, but that they are also more rapidly damped.

FIG. 6 shows the variations of the control setpoint torque Cf of the brakes 60, 70.

It is observed that, by virtue of the method used, the setpoint torque is very rapidly reduced and cancelled out in approximately 250 milliseconds, so that the electric motor 10 very rapidly assumes the braking of the motor vehicle on its own. The quantity of electrical energy recovered is thus maximized.

The present invention is in no way limited to the embodiment described and represented, but those skilled in the art will be able to apply any variant in line with its spirit thereto.

It would notably be possible to provide for the electric motor to be controlled not by torque but rather by speed.

It would also be possible to provide for calculating the forecast value of the engine speed differently, no longer from the control setpoints of the brakes and of the electric motor, but, for example, by searching for this value in a predetermined database.

As a variant, it will be possible to provide for the preventive low-pass filter to be replaced by a so-called signal derivative limiting filter.

Such a filter (not represented) makes it possible to limit the value of the variations of frequency of the braking instruction Cs when this frequency exceeds a predetermined maximum threshold and/or drops below a predetermined minimum threshold.

It would also be possible to provide for the invention to be implemented in a hybrid vehicle, in which case its operation would remain unchanged.

It would also be possible to provide for the invention to be implemented in a conventional vehicle, propelled solely by an internal combustion engine. In this variant, the means for recovering the energy generated by the braking of the vehicle would consist of an ad hoc element, such as, for example, an alternator, a pneumatic, mechanical or hydraulic means.

The invention claimed is:

1. A method for controlling a motor vehicle equipped with wheels, brakes, a recovery device for recovering energy generated in braking, and a torque transmission chain from the wheels to the recovery device, said method comprising:
   a) acquiring a braking instruction,
   b) measuring a dynamic characteristic of the recovery device to determine a measured value,
   c) calculating a first intermediate setpoint with a preventive filter which filters said braking instruction so as to attenuate an amplitude of the braking instruction around a resonance frequency of the torque transmission chain,
   d) calculating a second intermediate setpoint to damp oscillations of the torque transmission chain, the calculating including estimating a forecast value of said dynamic characteristic, calculating a difference between the measured value and the forecast value of said dynamic characteristic, filtering the difference to reduce high-frequency noise to produce a filtered difference, calculating a sum of the filtered difference and the forecast value, and filtering the sum with a curative filter,
   e) controlling said recovery device according to an electric motor control setpoint calculated as a function of said first and second intermediate setpoints, and
   f) controlling the brakes according to a braking setpoint calculated as a function of the braking instruction acquired in step a).

2. The control method as claimed in claim 1, wherein said electric motor control setpoint, said first intermediate setpoint and said second intermediate setpoint are torque setpoints.

3. The control method as claimed in claim 1, wherein the recovery device includes an electric motor, and said dynamic characteristic includes a speed of the electric motor.

4. The control method as claimed in claim 1, wherein said forecast value is calculated as a function of an expected value of the dynamic characteristic calculated as a function of the electric motor control setpoint and of the braking setpoint, the forecast value taking into account a delay between the measuring performed in step b) and the controlling said recovery device performed in step e).

5. The control method as claimed in claim 1, wherein, in step e), the electric motor control setpoint is calculated as a function of a saturated value of the first intermediate setpoint.

6. The control method as claimed in claim 5, wherein, in step e), the electric motor control setpoint is calculated to be equal to a saturated value of a sum of the second intermediate setpoint, and the saturated value of the first intermediate setpoint.

7. A motor vehicle, comprising:
   wheels,
   brakes,
   a recovery device for recovering energy generated in braking of the motor vehicle, and
   a torque transmission chain from the wheels to the recovery device, and
   a control unit for the recovery device and for the brakes, the control unit being configured to:
   acquire a braking instruction,
   measure a dynamic characteristic of the recovery device to determine a measured value,
   calculate a first intermediate setpoint with a preventive filter which filters said braking instruction so as to attenuate an amplitude of the braking instruction around a resonance frequency of the torque transmission chain,
   calculate a second intermediate setpoint to damp oscillations of the torque transmission chain, the calculating including estimating a forecast value of said dynamic characteristic, calculating a difference between the measured value and the forecast value of said dynamic characteristic, filtering the difference to reduce high-frequency noise to produce a filtered difference, calculating a sum of the filtered difference and the forecast value, and filtering the sum with a curative filter,
   control said recovery device according to an electric motor control setpoint calculated as a function of said first and second intermediate setpoints, and
   controlling the brakes according to a braking setpoint calculated as a function of the braking instruction.

8. A method for controlling a motor vehicle equipped with wheels, brakes, an electric motor to recover energy generated in braking, and a torque transmission chain from the wheels to the recovery device, said method comprising:
   a) acquiring a braking instruction,
   b) measuring a measured value of a dynamic characteristic of the electric motor,
   c) calculating a first intermediate setpoint with a preventive filter which filters said braking instruction so as to attenuate an amplitude of the braking instruction around a resonance frequency of the torque transmission chain,
   d) calculating a second intermediate setpoint to damp oscillations of the torque transmission chain, the calculating including estimating a forecast value of said dynamic characteristic, calculating a difference between the measured value and the forecast value of said dynamic characteristic, filtering the difference to reduce high-frequency noise to produce a filtered difference, calculating a sum of the filtered difference and the forecast value, and filtering the sum with a curative filter,
   e) controlling said electric motor according to an electric motor control setpoint calculated as a function of said first and second intermediate setpoints, and
   f) controlling the brakes according to a braking setpoint calculated as a function of the braking instruction acquired in step a).

9. The control method as claimed in claim 8, wherein said dynamic characteristic includes a speed of the electric motor.

* * * * *